United States Patent [19]

del Rosario

[11] Patent Number: 4,710,745

[45] Date of Patent: Dec. 1, 1987

[54] VEHICLE WARNING SYSTEM

[76] Inventor: Luis del Rosario, 1636 N. Verdugo Rd., Apt. #304, Glendale, Calif. 91208

[21] Appl. No.: 410,940

[22] Filed: Aug. 24, 1982

[51] Int. Cl.$^4$ ............... B60R 25/00; B60R 25/04; B60Q 1/46
[52] U.S. Cl. ........................ 340/63; 340/64; 340/81 R; 340/332; 307/10 AT
[58] Field of Search ............... 340/63, 64, 65, 81 R, 340/85, 74, 52 D, 52 R, 568, 571, 641, 321, 326, 331, 332; 307/10 AT

[56] References Cited

U.S. PATENT DOCUMENTS

| 1,856,391 | 8/1929 | Keppler | 70/241 |
|---|---|---|---|
| 3,299,402 | 1/1967 | Schilling | 340/74 |
| 3,432,808 | 3/1969 | Fleece | 340/321 |
| 3,493,924 | 2/1970 | Dobbins | 340/321 |

FOREIGN PATENT DOCUMENTS

| 8264/27 | 7/1927 | Australia | 340/74 |
|---|---|---|---|
| 414243 | 8/1934 | United Kingdom | 340/64 |

OTHER PUBLICATIONS

Ljungfeldt, "Car Theft Alarm", *Practical Electronics*, vol. 17, No. 7, Jul. 1981.
Edwards, "LED Flasher on Inexpensive IC", *Electronics Australia*, vol. 37, No. 4, Jul. 1975.
Schoolderman, "Simple Burglar Alarm", *Radio Elektronics*, vol. 28, No. 6, Mar. 1980.

*Primary Examiner*—John W. Caldwell, Sr.
*Assistant Examiner*—Tyrone Queen
*Attorney, Agent, or Firm*—John E. Wagner

[57] ABSTRACT

A psychologically sound automobile protection system designed to give a warning of electrical activity to anyone who enters the immediate region of the doors, windows or other openings of a vehicle. The system consumes so little energy when in operation that it is electrically connected to operate at all times when the ignition of the vehicle is off. The indicators are of such small size that they are hardly visible visible to anyone except those in the immediate region of the vehicle and particularly to those who might consider an unauthorized entry of the vehicle. The system includes a relay or other switching device which is connected to the battery or main power supply of the vehicle via the ignition switch whereby the relay or switching device is activated to apply power from the battery to the system when the ignition switch is off. Power is applied to a periodic circuit such as multivibrator which is connected to drive a flashing signalling device. The signalling device is preferably a red light emitting diode (LED). The signalling device and the periodic circuit produce very little current drain when in operation. The switching device, such as a relay is connected to the system to draw little or no current when the signal is operating, i.e. the ignition is OFF.

7 Claims, 3 Drawing Figures

VEHICLE WARNING SYSTEM

BACKGROUND OF THE INVENTION

In recent years the theft of automobiles and the burglarizing of behicles to steal valuab;le electronic equipment therein has reached epidemic proportions in certain areas. Certain insurers are reluctant to insure such vehicles for equipment because of the high loss rate. Various types of alarms have been devised to protect such vehicles. Some are set off by movement of the vehicle, others by starting of the ignition and others by opening of a door. Many such systems have a time delay after the action has taken place for the knowledgable owner or driver to disable the alarm system before it sounds. Others sound upon entry and the owner must make appropriate action to disable the alarm after a short period of operation. A common sight is an expensive vehicle parked and a person entering a vehicle with an alarm sounding.

Observers assume that the entry was authorized if the alarm stops after a few seconds. Such may or may not be the case. In any event, the sounding of an alarm is not necessarily a result which can protect the vehicle or its contents. Professional car thieves have ways of bypassing alarms or rendering them ineffective.

It has been said that a window sticker warning the would be intruder of the presence of an alarm is a greater deterrent than the alarm itself since it serves to deter persons before they damage the vehicle. Although professional thieves may not be discouraged by window stickers, many vandals and amateur thieves, who often do the most damage to a vehicle, are believed to look for easier pickings and leave the vehicle alone. Warning stickers, themselves, are passive and as a result, are of limited effectiveness.

BRIEF DESCRIPTION OF THE INVENTION

After many years facing this problem in connection with the installation of expensive radios and other accessories in luxury automobiles, I have developed an active electrical warning system which emains enabled during all periods in which the ignition switch in in the OFF position.

The system includes one or more small indicator lights which are clearly visible to one close to the vehicle and particularly near its doors. The lights preferably flash to add to their attention attracting capability. The lights preferably are light emitting diodes which draw very little current. A driving circuit, preferably a solid state multivibrator, provides operating power to the indicator light or lights, which power is drawn from the vehicle battery through the ignition switch. The system may or may not be connected to an alarm system.

BRIEF DESCRIPTION OF THE DRAWING

This invention may be more easily understood from the following detailed description and by reference to the drawing in which.

DETAIL DESCRIPTION OF THE INVENTION

Figure 1:
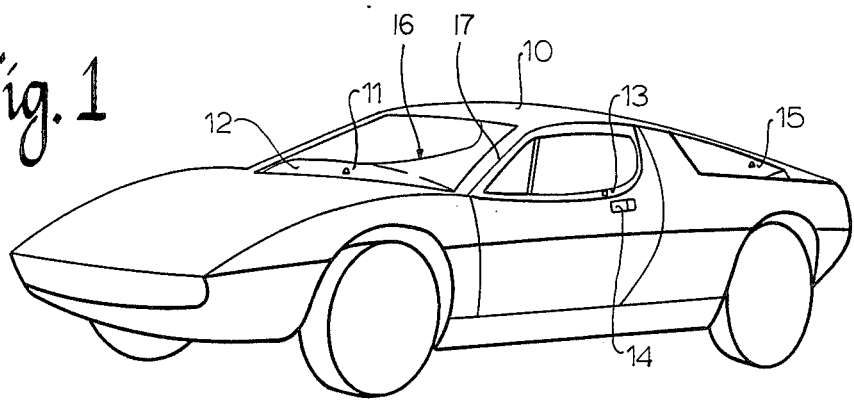
FIG. 1 is a perspective view on luxury automobile including this invention.

Now referring to FIG. 1, a luxury automobile 10 appears therein which presents the overall appearance just as it comes from the factory except for almost unnoticed additions appearing in FIG. 1. They include a small warning light 11 located on the front dash extending upward above the surface 12 of the dash. A second warming light 13 appears standing upward within the glass of the door in the region near the handle 14. The warning lights 11 and 13 may be ⅛ of an inch in diameter and extend upward approximately ⅛ of an inch above the surface where they are located. The warning lights preferably are light emitting diodes (LEDS), preferably red, in color.

As can be seen in FIG. 1, the warning lights 11 and 13 are hardly visible at a distance but are clearly visible to one who approaches the vehicle close enough to possibly make an unauthorized entry. Additional indicators can be located on the rear trunk deck such as indicator 15 and indicator 16 in the right hand door.

Figure 2:
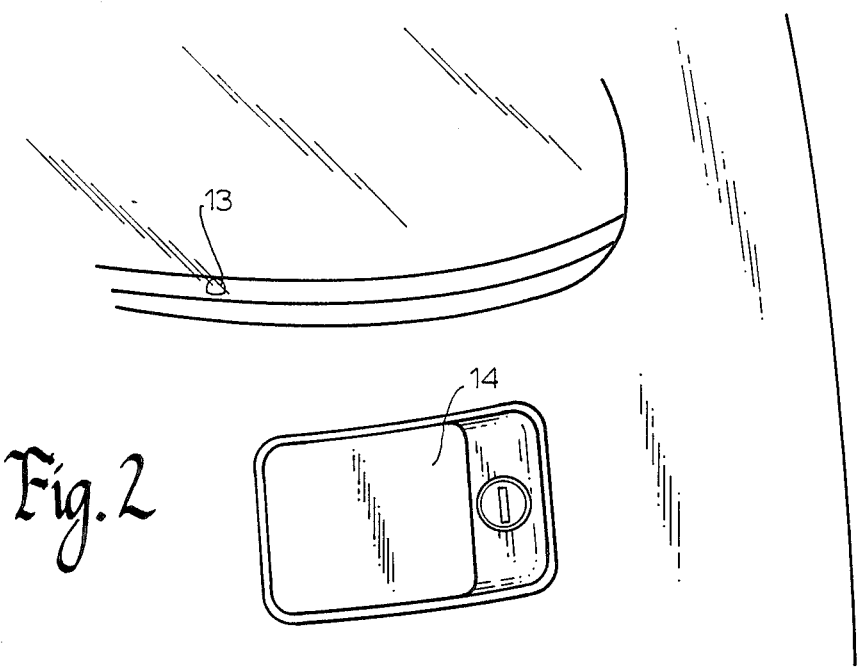
FIG. 2 is an enlarged fragmentary elevational view of the door handle region of the vehicle of FIG. 1.

The relative size of the indicator light of this invention is clearly illustrated in FIG. 2 which shows its unobtrusive nature. The position of the indicator, however, is such that despite it's small size anyone paying attention to the handle 14 or the wing ventilator 17 of FIG. 1 cannot help but notice the indicator.

Figure 3:
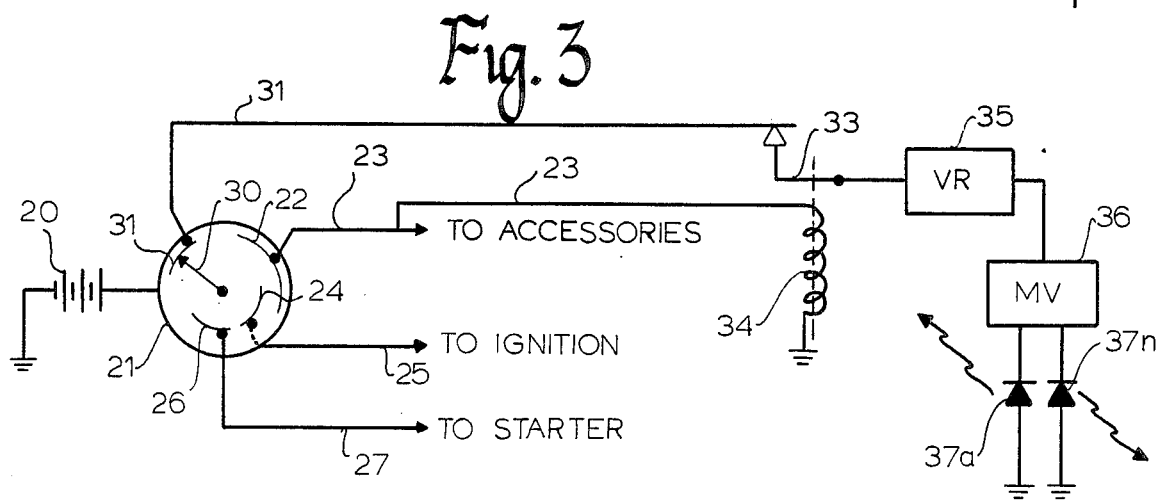
FIG. 3 is an electrical schematic diagram of this invention in use.

The electrical circuitry of this invention may be best understood by reference to FIG. 3 which shows the auto battery 20 which is connected by the ignition switch 21 to the auto accessories through switch segment 22 and lead 23; to the ignition through segment 24 and lead 25; and to the starter by segment 26 and lead 27. Battery power is applied by a wiper 30 as it is moved from the OFF position designated by segment 31 to segment 22, then 24 and momentarily to segment 26 to engage the vehicle starter. The wiper then is manually released where it returns to segment 24 and 22 thereby the accessories and the ignition are powered.

It should be noted that when the starter is in the OFF position power is conducted by a lead 32 to a pair of back contacts 33 of a relay 34 which has its other terminal grounded. The back contacts 33 are connected by a voltage regulator 35 to a multivibrator 36 including a plurality of outputs, each of which are connected to light emitting diodes 37a through 37n. 1, 2 or 4 diodes typically are used. The anodes of the light emitting diodes 37a through 37n are gounded. The relay 34 is connected by the terminal lead 23 whereby relay 34 is energized whenever the ignition switch is turned to the ON position. Energizing the winding of relay 34 causes back contact 33 to open and power to the light emitting diodes is interrupted. When the vehicle is not in operation, regulated power is applied to the multivibrator 36 and the diodes will flash intermittently depending on the rate of the multivibrator. I have found a rate of 3 to 9 flashers per second to be desirable.

A type G2U-113P relay produced by the OMRON Company of Japan has been found by me to work with this invention. A multivibratory LM340T or 7805 produced by the MATSU CHITA ELECTRIC Company of Japan works well as the multivibrator, Type 36 diodes of the Radio Shack Inc. of Fort Worth, Tex. have worked satisfactorily in my invention.

It should be noted in connection with this invention that the relay 34 is shown as a conventional relay and is operated only when the vehicle has its ignition switch in the ON position. The relay 34 does not draw any current when the ignition switch is OFF. The indicator circuit including the voltage regulator 35, multivibrator 36 and light emitting diodes 37a thru 37n draw only a minuscule amount of power so that the vehicle can be left unattended for a long period of time without danger of running down the battery 20.

Moreover, no action is required on the part of the user either to enable or disable the circuit. It operates wherever the ignition switch is off, and is disabled as soon as the ignition switch is turned on. This overcomes one of the difficulties of many types of alarm circuits which require prompt precise action on the part of the user. In this case the system may be installed and forgotten, and it works whenever the vehicle is unattended.

The foregoing is a representation of an example of this invention, and specific design or circuitry is considered to be illustrative and not limiting. By way of contrast this invention is determined by the scope of the following claims and the doctrine of equivalents.

I claim:

1. An electrical indicator for unattended vehicles including a battery and an ignition switch for starting the vehicle comprising at least one lighted indicator located at a position on a vehicle where it is visible from the exterior of the vehicle by one attempting an unauthorized entry of the vehicle;
   means for applying power from the battery of the vehicle to cause said indicator to be visibly active; and
   relay means including back contacts for coupling said power applying means to the battery of the vehicle and to the ignition swith of the vehicle;
   said relay means being operative to disable said power applying means when the ignition switch of the vehicle is ON byopening said back contacts whereby said indicator is operative when the vehicle ignition switch is in an OFF position and enabling said power applying means via said back contacts of said relay means when said relay means is not operated and is not drawing current;
   said electrical indicator being characterized by the absence of any switch required to be operated by the user to make the indicator visibly active or disabled other than the normal usage of the ignition switch.

2. A combination in accordance with claim 1 where said indicator comprises at least one light emitting diode.

3. A combination in accordance with claim 1 wherein said applying means comprises a multivibrator for flashing said indicator.

4. In combination in accordance with claim 1 wherein said indicator comprises a plurality of light emitting diodes located in the regions of the doors of the vehicle.

5. A vehicle warning system for use on a vehicle having a battery, an ignition switch and lockable doors, said warning system designed to deter would be intruders from attempting to gain unauthorized entry into the vehicle, consisting of:
   a plurality of visual indicators, one by at least one of the locakable doors of the vehicle;
   said visual indicators capable of producing intermittent flashing;
   means coupling said visual indicators to the battery of the vehicle to provide electrical energy to operate said visual indicators from the vehicle battery;
   said coupling means including means for intermittently flashing said visual indicators; and
   means coupled to the ignition switch of the vehicle for interrupting power from the vehicle battery to said visual indicators whenever said ignition switch is ON whereby the visual indicators flash at all times when the vehicle ignition switch is ON without any action of the user of the vehicle;
   wherein said coupling means constitutes a relay including back contacts which are normally closed when said relay is not operated;
   wherein said visual indicators are powered via said back contacts, and
   wherein said relay is coupled to the ignition switch of the vehicle whereby it is operated whenever the ignition switch is ON whereby said visual indicators are powered whenever said relay is not operated.

6. The combination in accordance with claim 5, wherein said coupling means constitutes a multivibrator for periodically energizing said visual indicators to produce a flashing effect.

7. The combination in accordance with claim 5 in which said visual indicators are mounted in the doors of the vehicle in the regions of the door locks but on the inside of the windows of the vehicle and clearly visible to a would be intruder approaching the vehicle and its doors and windows.

* * * * *

UNITED STATES PATENT AND TRADEMARK OFFICE
CERTIFICATE OF CORRECTION

PATENT NO. : 4,710,745

DATED : December 1, 1987

INVENTOR(S) : Luis del Rosario

It is certified that error appears in the above-identified patent and that said Letters Patent is hereby corrected as shown below:

Column 1, line 6, change "behicles" to "vehicles"

Column 1, line 6, change "valuab;le" to "valuable"

Column 1, line 44, change "emains" to "remains"

Column 2, line 9, change "warming" to "warning"

Column 2, line 60, change "multivibratory" to "multivibrator"

Column 3, line 35, change "swith" to "switch"

Column 3, line 39, change "byopening" to "by opening"

Column 4, line 16, change "locklable" to "lockable"

Signed and Sealed this

Thirty-first Day of May, 1988

*Attest:*

DONALD J. QUIGG

*Attesting Officer*  *Commissioner of Patents and Trademarks*